July 21, 1925.
R. E. VOM LEHN ET AL
1,546,610
FABRIC BELT
Filed Dec. 7, 1923
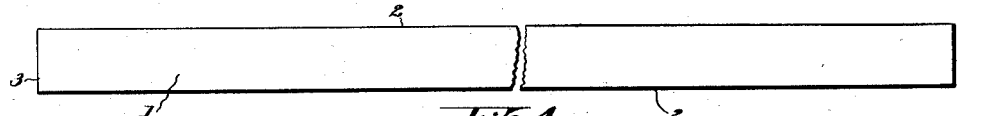
Fig. 1.
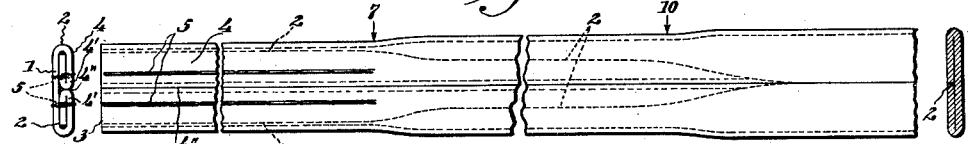
Fig. 3. Fig. 2. Fig. 4.
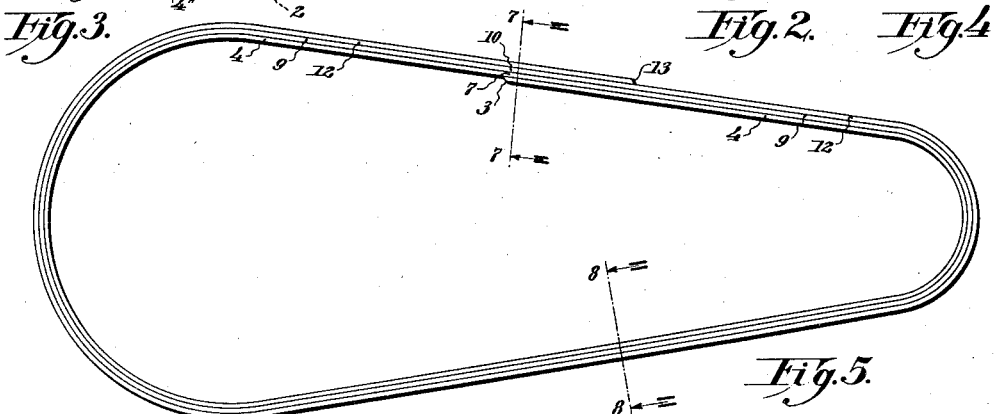
Fig. 5.
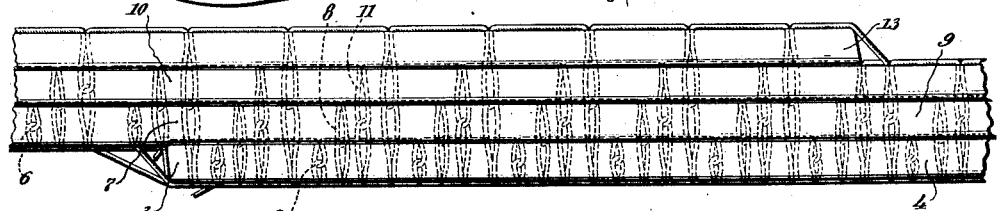
Fig. 6.
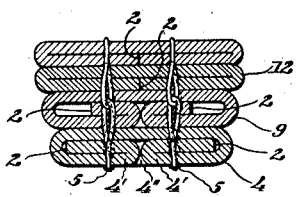
Fig. 7.
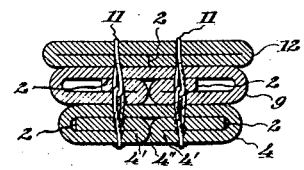
Fig. 8.
Fig. 9.
INVENTOR
R. E. Vom Lehn & A. H. DeVoe
BY Henry J. Miller
ATTORNEY Patented July 21, 1925.

1,546,610

UNITED STATES PATENT OFFICE.

REINHOLD E. vom LEHN, OF FANWOOD, AND ALBERT H. DE VOE, OF WESTFIELD, NEW JERSEY, ASSIGNORS TO THE SINGER MANUFACTURING COMPANY, OF ELIZABETH, NEW JERSEY, A CORPORATION OF NEW JERSEY

FABRIC BELT.

Application filed December 7, 1923. Serial No. 679,078.

*To all whom it may concern:*

Be it known that we, REINHOLD E. vom LEHN and ALBERT H. DE VOE, citizens of the United States, residing, respectively, at Fanwood, in the county of Union and State of New Jersey, and Westfield, in the county of Union and State of New Jersey, have invented certain new and useful Improvements in Fabric Belts, of which the following is a specification, reference being had therein to the accompanying drawings.

This invention relates to fabric belts and has for an object to provide an endless fabric belt having a long life and improved flexibility particularly adapting it to run around and effectively grip, without objectionable wrinkling or crimping, a pulley of relatively small diameter, such as the grooved pulley of a sewing machine motor. Another object of the invention is to provide an endless fabric belt which is particularly adapted to run in grooved pulleys and which is free from objectionable lumps or irregularities along its pulley-contacting surfaces. A further object of the invention is to provide an endless fabric belt of simplified construction enabling it to be expeditiously manufactured at low cost.

To the attainment of the ends in view a strip of fabric, such as muslin or canvas, has its longitudinal edges folded inwardly to provide a narrowed multiple-ply strip. The multiple-ply strip thus provided is wound longitudinally on itself a plurality of times and the layers thus formed are united by stitching passing preferably a plurality of times around the belt and securing each layer to all previously formed layers independently of subsequently formed layers. This disposition of the stitching greatly strengthens the belt and, in effect, concentrates the stitching in the inner layer or layers and gives the outlying layer or layers increased freedom to adapt themselves to the inner layer or layers with substantially no wrinkling or crimping of any of the layers as the belt flexes around a pulley. Preferably, the longitudinal edges of the initial strip are folded inwardly to progressively varying extents to produce a narrowed multiple-ply strip which varies progressively in width from one end to the other, whereby the finished belt wound up from such strip will be of V-section. The stitched belt may be impregnated with a suitable dressing to give it increased body and prolong its life, but this feature forms no part of the present invention.

In the accompanying drawings, Fig. 1 is a plan view of a fabric-strip from which the belt is made. Fig. 2 is a similar view, on a larger scale, illustrating the progressively varying extents to which the longitudinal edges of the strip are folded inwardly. Fig. 3 is a view of the beginning end of the folded strip shown in Fig. 2. Fig. 4 is a sectional view of the outer belt layer. Fig. 5 is an edge view of the completed belt. Fig. 6 is a fragmentary edge view of the belt on a larger scale and showing more or less diagrammatically the several courses of stitching which secure the layers of the belt together. Figs. 7 and 8 are enlarged sectional views on the lines 7—7 and 8—8, respectively, of Fig. 5. Fig. 9 is a fragmentary plan view of the outer layer of the belt showing the tapering of the outer end of the fabric strip.

In the preferred embodiment of the invention, as illustrated, 1 represents a strip of fabric of uniform width and of a length slightly greater than, say, three times the desired circumference of the belt. This strip may be cut from a piece of ordinary muslin and in such case will present raw side or longitudinally extending edges 2, 2. The width of the strip 1 is preferably about three times the width of the innermost layer of the belt. At the beginning end 3 of the strip 1, the side edges 2 are folded inwardly to form a narrowed multiple-ply layer 4, such as shown in Fig. 3, and are stitched to position by a double line of stitching 5, 5. In folding the fabric strip to form the first layer 4 it is preferred to double-fold or hem-fold the raw edges 2, 2 inwardly to equal extents, Fig. 7, so that the hem-folds 4′ will meet along the median line 4″ at the inner face of the layer 4, thereby concealing the raw edges 2, 2 within the respective hem-folds and producing a symmetrical construction with respect to said median line. The stitching of the inner layer 4 is continued as a first course 6 to the point 7 or a distance equal to the desired circumference of the belt, whereupon the beginning end 3 of the strip is brought around to the point 7 and the stitching continued as a second course 8 through the first layer 4 and a first course through the second layer 9. From the point 7 to the point 10, which represents the extent of the second layer 9, the edges 2 are folded inwardly to a lesser extent than in layer 4, whereby the width of the second layer 9 is increased.

When the stitching reaches the point 10 or the end of the second layer 9, the folded strip is further widened out by having its edges 2 folded inwardly to a still lesser extent, as shown in Fig. 4, and the stitching continued as a third course 11 through the first layer 4; the course 11 being a second course through the second layer 9 and a first course through the third or outermost layer 12. The top layer ends at 13 or a little beyond the beginning end 3 to secure a lapping of such ends; the stitching being continued across and a safe distance beyond the end 13 to prevent loosening of the latter end. It is preferred to taper the end portion of the top layer, as shown in Fig. 9, to neatly fasten off such end and reduce the tendency of such end to fray in use.

It will be seen that the number of stitches in the inner layer or layers is greater than in the outer layer or layers. The stitching is thus concentrated in the inner layer or layers and gives the outer layer or layers increased freedom to accommodate themselves to the inner layers in flexing about a pulley. Objectionable wrinkling or crimping of the belt layers is thus overcome and a belt of great strength and durability produced.

The belt may be made up by use of a two-needle, feed across the cylinder, sewing machine fitted with a suitable folder having means whereby its delivery end may be adjusted to vary the width of the folded strip issuing therefrom; space being provided between the delivery end of the folder and the throat-plate of the sewing machine so that the beginning end of the belt may be carried around the cylinder-bed of the machine and re-introduced to the needles beneath the folded strip issuing from the folder. By these means the fabric strip may be simultaneously folded, wound longitudinally upon itself and stitched. It is to be understood, however, that the strip may be entirely folded and pressed prior to stitching.

Having thus set forth the nature of the invention, what we claim herein is—

1. An endless fabric belt comprising a fabric strip wound longitudinally upon itself a plurality of times, and a continuous line of stitching extending longitudinally a plurality of times around the belt and securing each overlapping layer and all previously formed layers independently of subsequently formed layers.

2. An endless belt comprising a plurality of layers of longitudinally folded fabric strip material and stitching securing said layers together, the number of stitches in said layers decreasing progressively from the inner layer to the outer layer.

3. An endless fabric belt comprising a multiple-ply fabric strip wound longitudinally upon itself a plurality of times, and a continuous line of stitching extending longitudinally a plurality of times around the belt and securing the plies of each layer together and to all previously formed layers independently of subsequently formed layers.

4. An endless belt comprising a fabric strip folded longitudinally to form a narrowed multiple-ply strip and wound longitudinally upon itself a plurality of times, and a continuous line of stitching extending longitudinally a plurality of times around the belt and securing the plies of each layer together and to all previously formed layers independently of subsequently formed layers.

5. An endless belt comprising a strip of fabric having its longitudinal edges folded inwardly to form a narrowed multiple-ply strip, said narrowed strip being wound longitudinally upon itself a plurality of times, and a continuous line of stitching extending a plurality of times around the belt and securing the plies of each layer together and to all previously formed layers independently of subsequently formed layers.

6. An endless belt comprising a strip of fabric of uniform width having its longitudinal edges folded inwardly to progressively lesser extents to form a narrowed multiple-ply strip increasing progressively in width from one end to the other, said strip being wound longitudinally upon itself a plurality of times and stitched to form a multiple-layer endless belt of V-section.

7. An endless belt comprising a strip of fabric of uniform width having its longitudinal edges folded inwardly to progressively lesser extents to form a narrowed multiple-ply strip increasing progressively in width from one end to the other, said strip being wound longitudinally upon itself a plurality of times and stitched to form a multiple-layer endless belt of V-section; the end portion of the outer layer being tapered inwardly in width.

8. An endless belt comprising a raw-edged strip of fabric of uniform width having its longitudinal edges folded inwardly to progressively lesser extents to form a narrowed multiple-ply strip increasing progressively in width from one end to the other, said strip being wound longitudinally upon itself a plurality of times and stitched to form a multiple-layer endless belt of V-section: the inner layer having its raw edges hemfolded inwardly to equal extents on opposite sides of the median line to enclose said raw edges within said hem-folds.

9. An endless belt comprising a strip of fabric of uniform width having its longitudinal edges folded inwardly to progressively lesser extents to form a narrowed multiple-ply strip increasing progressively in width from one end to the other, said strip being wound longitudinally upon itself a plurality of times and stitched to form a multiple-layer endless belt of V-section; the stitching extending a plurality of times around the belt and securing the plies of each layer together and to all previously formed layers independently of subsequently formed layers.

10. An endless fabric belt comprising a fabric strip folded longitudinally of itself to form a narrowed multiple strip, said narrowed strip being wound longitudinally upon itself a plurality of times, and a continuous line of stitching extending from one end of said wound strip to the other and securing the plies of each layer together as well as securing each overlapping layer to all previously formed layers independently of subsequently formed layers.

11. An endless belt comprising a strip of fabric having both of its longitudinal edges folded inwardly to form a narrowed strip, said narrowed strip being wound longitudinally upon itself a plurality of times and stitched to form a multiple layer endless belt, the stitching which holds the layers of the belt together also serving as the means for holding the infolded edges concealed within the body of the belt.

In testimony whereof, we have signed our names to this specification, in the presence of two subscribing witnesses.

REINHOLD E. vom LEHN.
ALBERT H. DE VOE.

Witnesses:
HENRY A. KORNEMANN,
WILLIAM P. STEWART.